March 11, 1969 M. V. ANDERSON 3,432,379

THREE DIMENSIONAL FLEXIBLE DOVETAIL HONEYCOMB

Filed Oct. 22, 1965

INVENTOR
MALKOLM V. ANDERSON
BY Roland A. Anderson

ATTORNEY

United States Patent Office 3,432,379
Patented Mar. 11, 1969

3,432,379
THREE DIMENSIONAL FLEXIBLE DOVETAIL HONEYCOMB

Malkolm V. Anderson, Hayward, Calif., assignor to the United States of America as represented by the United States Atomic Energy Commission Filed Oct. 22, 1965, Ser. No. 502,687
U.S. Cl. 161—68 3 Claims
Int. Cl. B32b 3/12

ABSTRACT OF THE DISCLOSURE

A honeycomb panel which is comprised of identical flexible strips, each creased to form a series of single dovetails that have a central segment with a limited central area bonded to an opposing matching central segment of dovetail of an adjacent strip to form double dovetail cells. Each single dovetail is made to be particularly flexible along the boundaries of the bonded area to provide maximum independent extension in directions in the plane of the panel and maximum flexibility in directions normal to the panel.

The invention disclosed herein was made under, or in, the course of Contract No. W-7405-ENG-48 with the United States Atomic Energy Commission.

The present invention relates to an improved honeycomb structure and more particularly to a honeycomb structure adapted for use in packaging in which the width of the bonding zone joining together offset segmented surfaces of the honeycomb structure is limited with respect to the length of the sheets forming the honeycomb structure.

Configurations of presently available honeycomb core structures are generally flexible along the only two orthogonally intersecting axes. This limitation is improved by the structure of the standard dovetail honeycomb which is commonly composed of individual cells which are expandable to a hexagonal polycellular polyhedral shape commonly called dovetail honeycomb. Bending of such panels into complex shapes with acute curvatures, i.e., along three orthogonally intersecting axes, tends to cause rupture or crumpling of either the cell walls or to develop highly undesirable stress concentration at glue lines forming the cells resulting in tearing or glue line separation. In the absence of feasible compliant honeycomb cores in the prior art, various expedients requiring costly tailoring and fabrication techniques have been improvised. For example, the necessity for bending honeycomb panels have been previously eliminated by sectioning of the honeycomb panel in such a manner that the component sectional panels each make up a portion of the complex body or core portion with peripheral boundaries providing the desired surface configuration. In this manner, a single component panel is not subjected to severe flexural stress, but merely to unidirectional compressional-tensional stresses generally coincident with the longitudinal dimension of the cellular walls.

A further modification of honeycomb structures, used particularly in packaging or ornamentation is illustrated by the expandable tissue paper ornaments usually found shaped as a bell, sphere, etc., wherein very thin non-load bearing cellular walls are provided, e.g., tissue paper or the like, which can be deformed radically with little force. Such honeycomb structures are particularly adapted to configurations including solid or hollow spheres or cylinders but are not readily adaptable to be formed into other complex configurations and are not capable of bearing loads nor adaptable to the provision of high strength stressed surface layer structures.

The prior art does not provide core components adapted for the fabrication of honeycomb structures with continuous honeycomb cores which can be subjected to severe three dimensional stresses, e.g., toroids, spheres, cylinders, etc., without tending to cause rupture or separation of the honeycomb cells.

The present invention provides a honeycomb core panel structure in which the width of the adhesive or bond line is limited to a maximum of approximately fifty percent the width of adjacent lateral offset surface segments which are bound together by the glue line. By limiting the width of the glue line, a core panel structure is provided with unbonded contiguous cellular wall portions at locations normally bonded with which a honeycomb core structure having a remarkable flexibility is attained. This especially adapted and defined width of the bond line permits additional freedom in expanding or distorting the honeycomb core structure along any three orthogonally intersecting axes to either planarly or complexly curved configurations. As used in this application, "width" of the bonding "zone" or bonding "line" is intended to include a solid bond as well as a broken or discontinuous bonding zone on a single offset surface segment. For example, the width of the bonding zone as herein used is also intended to include the total width defined by two parallel bond lines, e.g., glue or welding, upon a single offset surface segment.

Accordingly, it is a primary object of the present invention to provide a honeycomb core structure of which a single horizontal panel can be bent or contorted into complex geometrical shapes such as complete spheres, hollow toroids, etc., without tending to cause crumpling or rupture of the honeycomb cell walls or glue lines.

A further object of the invention is to provide a honeycomb core structure with reduced density for any given material of which the honeycomb structure is constructed.

A still further object of the invention is to provide a honeycomb core structure exhibiting a high compressive strength parallel to the principal axes of the honeycomb cells in relation to the density for any given material of which the honeycomb structure is constructed.

Other objects and features of advantages of the invention will be apparent in the following description and accompanying drawings illustrating the construction of the honeycomb of the present invention, in which.

The honeycomb structure of the present invention comprises a series of interconnected surfaces defining interconnected cells in which a plurality of parallel spaced strips or sheets of flexible material creased or deformed along generally parallel linear regions to provide offset planar surface segments are joined by angularly oriented wall segments which offset segments mate with and are bonded to similar offset surface segments of an adjacent sheet. The bond zone joining together the mating planar surface segments is located in a median or central longitudinal area upon the mating surface segments in substantially parallel and coextensive relation to the deformations of the respective sheets. The bond zone is further preferably limited to the order of one third or less the width of the offset planar surface segments of each sheet divided substantially equal to each side of the median line so that a honeycomb core of isotropic deformation characteristic is provided.

Figure 1:
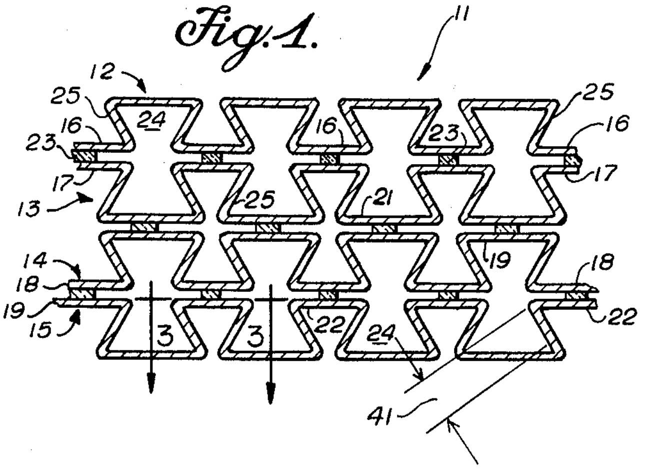
FIGURE 1 illustrates a cross-sectional view of a typical dovetail honeycomb structure with the glue line limited to one third the area of adjacent lateral surfaces of cell defining wall portions which are bound together by the glue line.

Referring now to FIGURE 1, honeycomb structure 11 is constructed from a plurality of sheets, for example, 12, 13, 14, and 15 deformed to provide parallel, elongated, offset planar surface segments 16, 17, 18 and 19. Alternate offset segmental surfaces, e.g., 16 of sheet 12, mate with interalternate offset segmental surfaces, e.g., 17 of sheet 13. Similarly, alternate offset segmental surfaces 18 of sheet 13 mate with interalternate offset segmental surfaces 19 of sheet 14. Also, similarly, alternate offset segmental surfaces 21 of sheet 14 mate with interalternate offset segmental surfaces 22 of sheet 15. Offsetting segments 25 constitute the remainder of sheets 12, 13, 14 and 15 and provide continuity between alternate and interalternate offset segmental surfaces, for example 18 and 17 respectively, of sheet 13. Iterated similar construction may be provided through additional sheets to extend the width of honeycomb structure 11 to any extent desired. Preferably, the deformations of sheets 12, 13, 14, and 15, provide a dovetail configuration within said sheets with surfaces 16, 17, 18, 19, 21, 22 forming the projecting, offset planar surface segments of said dovetail configured sheets.

Sheets 12, 13, 14, and 15, may be formed for example, of paper, metal, plastic, cloth or other sheet material; however, the sheets are preferably formed of 40 pound kraft paper for economic reasons as when the core is to be used as packing, decorative device, etc. Said sheets if porous or of fabric may further be impregnated with resin to provide thickness and additional compressive strength. The choice of material may be made in accord with practice in the art with due regard to conditions of use, e.g., temperature, environment, strength, etc.

Bonding means 23 are disposed between each pair of mated offset segmental surfaces to provide bonding between adjacent segmental surfaces. The width of the zone of bonding means 23 is selected in accordance with the teachings of the invention to be a maximum of fifty percent and preferably of the order of thirty percent or less than the width of offset planar surface segments 16, 17, 18, 19, 21 and 22. In the present embodiment, this selected bond width corresponds to the mating bond surface width of composite bonding means 23 of each sheet, for example 12, being equal to or less than 20% of the extended length of, for example, sheet 12. Preferably, bonding means 23 is an adhesive strip and more preferably a strip of setting phenol-aldehyde adhesive resin. In order to permit maximum extension of the honeycomb cells, typically 36, glue lines 23 are preferably centrally disposed on said mating planar surface segments 16, 17, 18, 19, 21 and 22. For the same reason, glue lines 23 are preferably substantially parallel to and coextensive with the lines of deformation of sheets 12, 13, 14, and 15. To still further permit maximum expansion of cells 36, the width of glue lines 23 are of the order of 50% or less the width of planar surface segments 16, 17, 18, 19, 21 and 22, and more preferably are substantially 30% thereof.

In the normal unflexed but expanded condition of honeycomb structure 11, sheets 12, 13, 14, and 15, preferably formed and bonded as discussed hereinabove, form substantially hexagonal polyhedral cells 24. The lengths of offset planar surface segments 16, 17, 18, 19, 21, and 22, and the planar surfaces 26 of sheets 12, 13, 14, and 15, interdisposed therebetween control the size of individual cells 24. The depth of cells 24 and honeycomb structure 11 is selectively controlled by the widths of sheets 12, 13, 14, and 15, or the widths to which said sheets are collectively cut.

Figure 2:
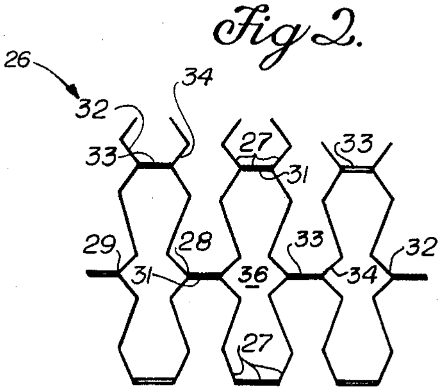
FIGURE 2 illustrates the honeycomb structure of FIGURE 1 in an extended configuration as would be generated when the honeycomb is bent or distorted to provide core shapes as contemplated for typical applications.

Referring now to FIGURE 2, honeycomb structure 26 is suited to be extended or expanded in typical applications to cause deforming forces upon offset segmental planar surfaces 27 with the result that planar surface 27 is deformed along edges 28 and 29 of glue line 31 into three nonplanar surfaces 32, 33 and 34 which no longer occupy a common plane.

The effective length of the circumference of cells 36 within an expanded configuration of honeycomb structure 26 as hereinbefore described is increased by deformed surfaces 33 and 34 as compared to the corresponding undeformed surface. Thereby, the volume is increased and the density of the material in the honeycomb structure 26 per unit volume occupied by said structure 26 is decreased.

Further, the deformation of sheets 12, 13, 14, and 15, provide more numerous segment wall portions and increase the effective number of angularly oriented wall segments, e.g., the total of fourteen deformations or creases along the periphery of each cell 36. The increased number of deformations along the periphery of each cell 36 provides additional compressive strength parallel to said deformations for a given density of honeycomb structure 26.

Still further, the presence of fourteen planar surfaces and fourteen deformations or creases along the periphery of each cell 36 provides a remarkable additional freedom of compliant bending within each cell 36 and hence within entire honeycomb core structure 26 to facilitate fabrication and the provision of core structures not heretofore achievable. For example, honeycomb structure 26 is admirably adapted for contortion of a single unsectioned panel into complex three dimensional shapes such as complete spheres, hollow toroids, etc.

A further example of addition freedom of bending as provided by the present invention is exemplified by its ability to be expanded to form cells having a circular or ovular shape whereas the standard dovetail honeycomb cells are limited in expanded configuration to a substantially rectangular panel form. It will also be appreciated that with the honeycomb core of the invention arranged to encompass the inner or outer periphery of a spherical or complex shaped volume, body, shell or the like, the cellular walls are generally oriented to extend radially in a uniform divergent patern. For example, with one surface defined by the edges of the cell walls, e.g., a planar surface brought into contact with the surface of a sphere, the polyhedral cells in effect define truncated spherical polygonal segmental volumes radiating from the surface of the sphere with the origin thereof at the center of the sphere. Accordingly, the compressive strength of the body is isotropic in all directions.

Figures 3, 4:
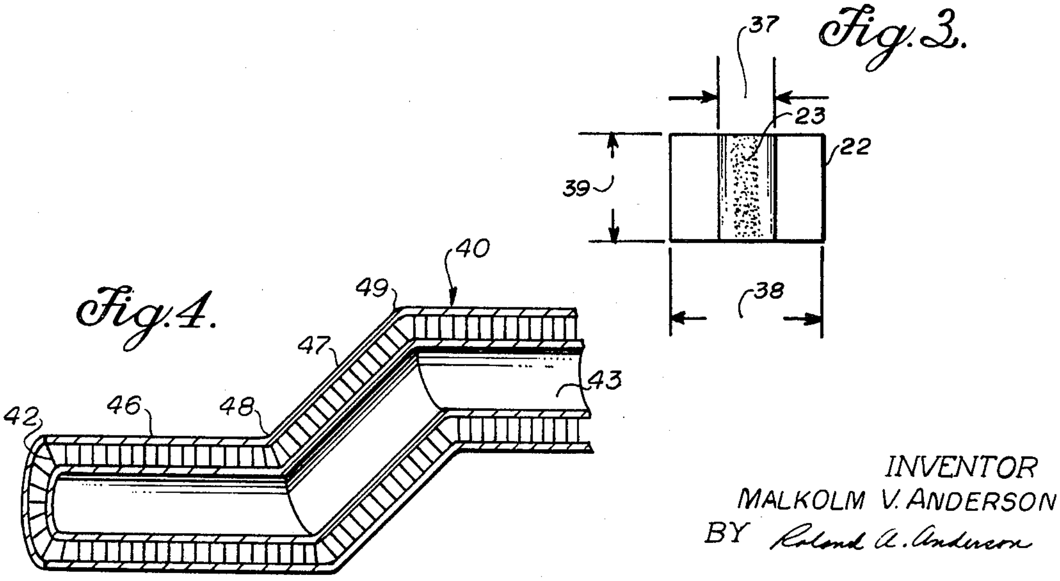
FIGURE 3 illustrates the honeycomb structure of FIGURE 1 in more detail as a planar view of a typical offset surface segment and the bonding means by which it is joined.
FIGURE 4 illustrates a cross-sectional view of a single panel of the present modified honeycomb structure adapted to a skew cylindrical shape.

Referring now to FIGURES 1 and 3, the width 37 of bond zone 23 is limited to the order of no greater than 50% and preferably 30% of the width 38 of the offset surface segment, for example 22, for which it serves as a bond. Preferably, the width dimension of sheets, for example 12, 13, 14 and 15, which corresponds to the principal axis of cells 24 is large when the honeycomb structure is formed. The final thickness 39 of the honeycomb structure is achieved by cutting or slicing the compacted honeycomb structure 11.

A typical example of the subject honeycomb structure 11 was constructed with the following dimensions. The width, for example 38, of the offset surface segments, for example 22, was one-half inch. The width, for example 41, of offsetting segments, for example 25, was three-sixteenths of an inch. In accordance with the above description, the width 37 of glue line 23 was one-sixth inch. The thickness 39 of honeycomb structure 11 was selected and cut to one-half inch.

Referring now to FIGURE 4, there is illustrated a panel structure 40 formed into a complex configuration comprising a single expanded modified honeycomb panel 42, of a type described hereinbefore, circumdisposed in touching relation to inner skew skin cylinder 43. Cylinder 43 is of a structural material, for example, wood, metal, plastic or glass. If it is desired to form panel structure 40 into various complex shapes, skin cylinder 43 would be made flexible and expandable. Honeycomb panel 42 may be of any of the honeycomb materials discussed hereinbefore, preferably paper. Abutting surfaces of honeycomb panel 42 and cylinder 43 are bonded with a suitable bonding means, preferably glue. Outer skew skin cylinder 46 is similar to and is disposed coaxial with inner skew skin cylinder 43. The inner diameter of cylinder 46 greater than the outer diameter of inner cylinder 43 by the radial thickness of expanded circumdisposed panel 42. Outer skew cylinder 46 is similarly bonded to abutting surfaces of panel 42. Thus, structure 40 is a sandwiched structure with panel 42 comprising the core material and inner and outer cylinders 43 and 46 comprising, respectively, the inner and outer skins of the sandwich structure. Structure 40 illustrates the remarkably increased adaptability of the present invention to complex forms. Standard honeycomb would require sectioning, for example, along the skew junctions 48 and 49 of structure 40 as well as along two radially opposite transverse dimensions of structure 40, in order to facilitate the formation of structure 40. A single panel of the present modified honeycomb may be arranged to form complex structures such as structure 40 with only a seam along one transverse dimension of structure 40 without undue tensional or tearing stress placed on the honeycomb walls of panel 42.

While the present invention has been described with particular respect to a single embodiment, it will be apparent that numerous modifications and variations are possible within the spirit and scope of the invention.

For example, the honeycomb structure can be fabricated from sheets deformed into a dovetailed shape or more accurately parallel offset panels with single perpendicular panels thereinbetween to provide continuity of the sheets as in conventional practice. The teachings of the present invention are also applicable where the individual honeycomb sheets are otherwise shaped, e.g., parallel offset panels are provided with two or more offsetting surface segments betwen each pair of adjacent alternate and interalternate offset surface segments of a single sheet.

Further, the present invention has ben described with particular respect to a glue line of defined uniform continuous width in joining or bonding mating segmented surfaces. The present invention is also applicable where other bonding methods are employed, for example, where seam welding or soldering is employed to join mating metallic surfaces of the honeycomb structure or heat sealing is used to join thermoplastic resin surfaces, e.g., polyethylene, polyvinyl, chloride, polyester, etc.

Still further, the present invention is described in particular relation to expansion of the present honeycomb structure to cause individual cells thereof to be of a fourteen sided configuration. It is to be noted that further expansion would cause the cells to assume an elongated ovular shape but that the optimum properties of the honeycomb structure, e.g., density, compressive strength, etc., for most applications would be achieved with the honeycomb structure expanded to the hereinabove discussed fourteen sided configuration.

Also, the present invention is described with particular respect to a honeycomb structure in the configuration of a single flat panel which is adaptable to a multitude of various complex shapes. It is obvious that the present invention is also applicable to other honeycomb configurations such as sectional honeycomb panels used in packaging.

Still further, the present invention is described with respect to FIGURE 4 as a honeycomb structure adapted to a skew cylindrical shape. This description is intended only to illustrate a possible complex form into which a single panel of the present modified honeycomb may be configured without undue stress on the honeycomb material. As noted hereinbefore, the present described honeycomb structure may be similarly adapted to other complex shapes such as spheres or toroids.

What is claimed is:

1. A three dimensionally flexible cellular structure, comprising:

(a) a plurality of substantially parallel spaced flexible strips, each strip having deformations to provide a plurality of offset segments having surfaces that are substantially planar and parallel, said offset segments being aligned to mate with offset segments of adjacent strips to form a plurality of cells, said plurality of cells all having a double dovetail shape and comprising all of the cells of said structure; and (b) adhesive bonding means disposed to join together central sections of mating segments to form bonding joints, each of said bonding joints having opposing planar surfaces abutting opposing surfaces of mating segments, abutting ones of said joint and segment surfaces being coplanar, said bonding joints having four edges that are substantially parallel to said deformations, said strips being flexible at each of said bonding joint edges, and the width of each bonding joint being less than 50% of the width of the associated offset segments, each of said cells being deformable to have fourteen independent sides upon extension of said structure in a direction perpendicular to said segments.

2. The structure of claim 1, wherein said cells have substantially identical dimensions in a plane orthogonal to said segments.

3. The structure of claim 1, wherein said strips are substantially identically formed and each of said cells is identically formed solely with portions of two adjacent strips.

References Cited

UNITED STATES PATENTS

| | | | |
|---|---|---|---|
| 2,772,757 | 12/1956 | Hammond | 161—127X |
| 3,016,315 | 1/1962 | Robinson | 156—197X |
| 3,018,205 | 1/1962 | Barut | 161—68 |
| 3,070,198 | 12/1962 | Haskell. | |

FOREIGN PATENTS

| | | |
|---|---|---|
| 750,610 | 6/1956 | Great Britain. |

ROBERT F. BURNETT, *Primary Examiner.*

P. THOMAS, *Assistant Examiner.*

U.S. Cl. X.R.

52—662, 671; 161—127, 132, 148